United States Patent
Haesendonckx et al.

(10) Patent No.: US 10,399,731 B2
(45) Date of Patent: Sep. 3, 2019

(54) CLUSTER PACK COMPRISING CONTAINERS HAVING A REINFORCED WALL SECTION

(71) Applicant: KHS GmbH, Dortmund (DE)

(72) Inventors: Frank Haesendonckx, Hamburg (DE); Christian Rommel, Stockelsdorf (DE)

(73) Assignee: KHS GmbH, Dortmund (DE)

( * ) Notice: Subject to any disclaimer, the term of this patent is extended or adjusted under 35 U.S.C. 154(b) by 204 days.

(21) Appl. No.: 15/540,673

(22) PCT Filed: Dec. 22, 2015

(86) PCT No.: PCT/EP2015/081065
§ 371 (c)(1),
(2) Date: Jun. 29, 2017

(87) PCT Pub. No.: WO2016/113095
PCT Pub. Date: Jul. 21, 2016

(65) Prior Publication Data
US 2018/0002058 A1    Jan. 4, 2018

(30) Foreign Application Priority Data

Jan. 12, 2015   (DE) ......................... 10 2015 100 346

(51) Int. Cl.
| | | |
|---|---|---|
| B65D 1/46 | (2006.01) |
| B65D 21/02 | (2006.01) |
| B65D 69/00 | (2006.01) |
| B65B 17/02 | (2006.01) |
| B65B 51/02 | (2006.01) |
| B65G 47/08 | (2006.01) |
| B65B 27/04 | (2006.01) |

(52) U.S. Cl.
CPC ............... *B65D 1/46* (2013.01); *B65B 17/02* (2013.01); *B65B 27/04* (2013.01); *B65D 21/0205* (2013.01); *B65D 69/00* (2013.01); *B65G 47/088* (2013.01); *B29B 2911/14326* (2013.01); *B29B 2911/14333* (2013.01); *B29B 2911/14346* (2013.01); *B65B 51/02* (2013.01)

(58) Field of Classification Search
CPC . B65B 27/04; B65B 17/02; B65B 2911/1433; B65D 21/0205; B65D 1/46; B65D 21/0201; B65D 21/0208
USPC .................................. 220/23.4, 23.2, 23.83
See application file for complete search history.

(56) References Cited

U.S. PATENT DOCUMENTS 3,388,791 A    6/1968  Walsh

FOREIGN PATENT DOCUMENTS

| CN | 101959763 | 1/2011 |
|---|---|---|
| DE | 38 54 903 | 9/1996 |
| DE | 10 2011 109956 | 1/2013 |
| DE | 10 2011 119 968 | 6/2013 |
| DE | 10 2012 100 810 | 6/2013 |
| DE | 10 2013 105 428 | 11/2014 |
| WO | WO2009/106466 | 9/2009 |

*Primary Examiner* — Anthony D Stashick
*Assistant Examiner* — L E Kmet
(74) *Attorney, Agent, or Firm* — Occhiuti & Rohlicek LLP

(57) ABSTRACT

A cluster pack comprises at least two containers connected by a glued joint. One of the containers has a thickened wall region in the region of the glued joint. This region acts as a well reinforcement to reduce the risk of tearing a container during detachment from the cluster pack.

20 Claims, 2 Drawing Sheets

CLUSTER PACK COMPRISING CONTAINERS HAVING A REINFORCED WALL SECTION

RELATED APPLICATIONS

This application is the national stage, under 35 USC 371, of PCT/EP2015/081065, which was filed on Dec. 22, 2015, which claims the benefit of the Jan. 12, 2015 priority date of German application DE 10-2015-100346.5, the contents of which are herein incorporated by reference.

FIELD OF INVENTION

The invention relates to a cluster packs, and in particular, to cluster packs in which containers of the cluster pack are glued to each other.

BACKGROUND

A container typically has a circular cross-section. However, the diameter of the section is not constant as a function of height along the container. Many containers have a container wall that, at some height, has a diameter that is greater than the container's diameter at other heights. This section is often called a "ring" or "rolling ring."

When containers of this type are glued to form a cluster pack, there is a risk that the containers will tear when being separated. In particular if they are connected by glued joints in the lower half of the containers, the resulting leverage that arises during container separation is substantial.

SUMMARY

In one aspect, the invention features a cluster pack having at least two containers that are interconnected by a glued joint. The containers have a wall that comprises a wall reinforcement in the region of the glued joint or adjacent to the glued joint. The wall reinforcement resists forces that arise when one attempts to detach a container from the cluster pack. This helps avoid tearing the container itself.

The wall reinforcement is preferably only provided locally. This avoids using excessive amounts of material just to make the wall reinforcement. However, in an alternative embodiment, the wall reinforcement extends circumferentially around the container wall.

Bottles usually comprise a region with a greater outer wall diameter than the cylindrical basic body of a walled bottle. This region, which is called a "rolling ring," has a greater outer wall diameter than that of the rest of the bottle but otherwise has the same wall thickness. This is the region that contacts other containers or that engages conveyors or guiding tools. In a preferred embodiment, the glued point or glued joint is arranged at the rolling ring.

As used herein, "container" refers to bottles, cans, tubes, and sachets, in each case made of metal, glass, plastic, and/or a material composite, typically, for example, PET bottles or a material composite of plastic, aluminum foil, and paper. All materials can comprise the containers, in particular such as are suitable for filling with fluid or viscous products. The term "containers" also include containers that are already assembled into groups, i.e., multi-packs. The containers of the cluster pack are preferably arranged in non-nesting positions, i.e. the containers of one row of the cluster pack are not arranged in the gaps of an adjacent row of the cluster pack.

The containers can have any cross-section, including oval, circular, and polygonal. A container can be shaped like a sachet, pyramid, or parallelepiped. However, a container is frequently cylindrical, either fully or in sections. Examples of fully cylindrical containers include cans. Examples of containers that are cylindrical in sections include bottles, which start from a cylindrical basic body and tapers towards the opening, and/or with the bottle standing at the lower end on point-like support regions, and with the bottle wall transforming in transition sections from the point-like support regions towards the basic body and into the cylindrical bottle wall. A container has a height that is measured from the lower end, upon which the container stands on a support surface, to an upper end, which, in most cases, includes the container's opening.

To significantly reduce the likelihood of tearing, it is sufficient for the container wall to be configured in the region of the wall reinforcement so that it is at least 5% thicker than the rest of the wall. In some cases, it is at least 10% thicker. In others, it is at least 30% thicker. And in still others, it is thicker by at least 50%. The dimension of the wall reinforcement to be selected in each case is to be selected by the person skilled in the art as a function of the size and shape of the container and of the wall thickness. The thicker the container wall is to begin with, the less wall reinforcement would be required.

In some embodiments, the wall reinforcement is applied in sections.

In certain embodiments, the diameter of the wall reinforcement is at least 3% greater than that of the glued joint that is to be applied. Preferably, the diameter of the wall reinforcement is at least 15% greater than that of the glued joint that is to be applied.

In other embodiments, the diameter of the wall reinforcement is selected such that its surface area is at least 3% greater than that of the glued joint that is to be applied. Preferably, the diameter of the wall reinforcement is selected such that its surface area is at least 15% greater than that of the glued joint that is to be applied.

The size of the wall reinforcement that is to be applied in sections to the container wall is selected to minimize the use of additional material. This makes manufacturing the containers more economical. The slightly greater diameter of the wall reinforcement makes it easier to apply the glue without missing the wall reinforcement. This makes container manufacture easier since greater tolerance can be permitted.

The wall reinforcement's greater diameter also improves the force conditions when the container is detached from the cluster group. According to an advantageous embodiment of the invention, if appropriate, a greater diameter of the wall reinforcement can be integrated with a reduced thickening of the container wall. The same applies to a further preferred embodiment of the container wall, with which the wall reinforcement comprises surface area at least 3% larger than the glued joint to be applied on the wall reinforcement.

The shape of the wall reinforcement is purposefully determined in accordance with the shape of the glued joint that is to be applied. The wall reinforcement can be circular, oval, or polygonal. In a preferred embodiment, it forms a plateau having a circular or oval base. In other embodiments, it surrounds the glued joint as circumferential ring-shaped wall reinforcement. In yet other embodiments, it partially overlaps the glued joint.

In some embodiments, the wall reinforcement is a ring that spans the entire circumference and that extends inwards towards the container's axis. This ring has is flush with the container's outer surface such that the outer surface remains undisturbed or uninfluenced by the reinforcement. The reinforcement can be cylindrical or cambered. Or it can have a design pattern, such as grooves, structures, or other shapes that can span the container's surface. These features could then extend undisturbed into the reinforced wall region.

In particular with glued joints that occupy a substantial surface area, it may prove advantageous for the wall reinforcement to be applied, for example, only in the outer region of the glued joint. As a result, the wall reinforcement surrounds the glued joint but does not span it. Such an arrangement strengthens the resistance of the container wall against the forces incurred at the detachment of the container from the cluster pack, while at the same time minimizing the use of material.

In particular applications, the wall reinforcement can also be formed next to the glued joint, immediately adjacent to it, or partially overlapping, for example in situations in which, at the detachment of the container from a cluster pack, tension peaks occur in the area surrounding the glued joint, which frequently lead to the tearing of the container.

According to a particularly preferred embodiment of the invention, the transition from the wall reinforcement to the container wall is configured as a tapering transition region. Such a transition region with tapering wall thickness avoids the occurrence of tension peaks at the detachment of a container from the cluster pack, and therefore ensures, even with a reduced wall reinforcement, that the tearing of the container will be avoided The method according to the invention for producing a cluster pack with at least two containers, at least one if which has a reinforced wall section, includes providing a container preform in which there is a thicker application of material at a predetermined location, producing a first container from the preform, wherein the first container comprises a wall reinforcement at the location of the thicker application of material, aligning the first container in relation to a glue applicator in such a way that the glue is applied such as to produce a glue point on the wall reinforcement or adjacent to it, and attaching a second container by pressing it against the glue point of the first container.

The method according to the invention makes provision that, already at the provision of preforms for containers, these preforms comprise a thickened application of material at predetermined points. The thickened application of material by the layering of material sections, wherein the material sections additionally layered onto the preform are preferably of the same material as the preform or the container wall derived from it, typically, for example, polyethylene terephthalate (PET). The layered material section is preferably thinner than the material thickness of the preform, but, if necessary, can also be thicker. According to an advantageous embodiment of the method according to the invention, the additional material section is fixed on the preform at a predetermined point, for example integrally with the production of the preform, such as by casting or injection molding, by applying more material at the predetermined point. As an alternative, the material section can also be adhesively bonded or welded to the material of the preform. A container is then produced from the preform in an inherently known manner. This container then comprises a container wall that is provided in sections with a wall reinforcement, and specifically at the point at which the preform had a location of thickened material application.

According to the invention, the container that comprises a container wall with wall reinforcement is now aligned in such a way that the means for the application of glue, typically a nozzle, applies the glue onto or adjacent to the wall reinforcement. The alignment of the containers is carried out by inherently known means for rotating containers. Sensors that can detect a different material thickness in the container wall are likewise known.

The first container, which has a glue point on or in the vicinity of a wall reinforcement, is then joined to a second container, usually in that the containers are pressed against one another, for example by clamp strips, and, if necessary, the glue that is now present on both containers is hardened or cross-linked.

According to an advantageous embodiment of the invention, the second container, on which no glue point has been applied, nevertheless also comprises a wall reinforcement, since the forces that lead to the tearing of the container take effect not only on the container on which the glue point was applied, which, as a glued joint, now connects the first and second containers. With this embodiment of the invention, the second container is also aligned, before the joining, in such a way that its wall reinforcement, or regions of the container wall adjacent to the wall reinforcement, is or are pressed onto the glue point on the first container.

The production of a glued joint between two containers from a glue point applied onto one container takes place by the compacting or pressing the two containers against one another, wherein the glue of the glue point connects the two containers at a glued joint.

As used herein, "glue" refers to any substance that is suitable for the production of a glued connection between two containers, in particular such substances, materials, or compounds which, when applied in the fluid or viscous state, form a self-bonding glue point, but also such substances, materials, or compounds which, by the application of energy, for example by the application of pressure, radiation, or temperature, or by means of chemical hardening or cross-linking, build up a glued joint. Typical glues are UV-hardening glues, that can also be processed in a low-viscosity state and can be hardened by radiation, or a hot glue, that cools after application and that, below a temperature typical for the material, varies in its adhesive strength, such that hot glue is only suitable for the immediate formation of a glued joint. As used herein, glues can include multi-layered materials, e.g. such as one of at least one carrier material, which is coated with a glue in such a way that a glued joint can be produced between two containers. Typically, these multi-layered materials are formed as pads, which are formed as adhering or adhesive on two sides.

A container formed with a glue point therefore comprises glue that is applied at a point, along a line form, or in some pattern of points or lines. Preferably, the glue is selected such that its adhesive strength is low enough to permit detachment of a container from the cluster pack by hand. UV-hardening glues are particularly suitable because the adhesive strength that the glue develops at the glued joint can be adjusted by the composition of the glue and the extent of the hardening.

The cluster packs according to the invention are connected to one another by glued joints. Preferably, the glued joints connect the cluster packs directly to one another. For further preference, the glued joints represent the exclusive or sole connection of the containers of a cluster pack. According to an advantageous embodiment, however, it is also possible for a cluster pack to be provided at its upper end with a transport securing element, in particular a transport securing element in the form of a band. According to a further preferred embodiment of the invention, the transport securing element can be lengthened to a carrying loop.

Preferably, the glue points and the glued joints derived from them are configured to be as small as possible, in order to economize on glue.

The application of the glue takes place by way of nozzles that apply or spray the mostly liquid glue directly onto a container to form one or more glue points. After the application of the adhesive, the containers are joined, for example by the effect of clamp strips, which bring a plurality of containers into contact, such that, at the locations at which a glue point has been applied on a first container, a glued joint is formed by bringing a second container without a glue point into contact with the first. The second container can likewise comprise a glue point at the location at which the first container comes in contact, such that a glued joint can be formed from two glue points.

A device according to the invention for producing a cluster pack with at least one first and one second container, in each case comprising a container wall, is characterized in that the device comprises means for conveying a first and a second container, means for aligning a first container, means for applying a glue point on the first container, and means for joining the first and the second container to form a cluster pack, wherein the means for aligning the first container align the first container with the provision that the means for applying a glue point take effect on or adjacent to a wall reinforcement, which is comprised in the container wall of the first container.

In another aspect, the invention features a device that comprises means for alignment, which align the second container before the joining, with the provision that, at the joining of the first and second containers, a wall reinforcement of the second container is joined to or adjacent to the glue point of the first container.

BRIEF DESCRIPTION OF THE DRAWINGS

These and other features and advantages of the invention will be apparent from the following detailed description and the accompanying figures, in which.

The above figures are not drawn to scale. Certain features have been exaggerated to promote clarity of expression.

DETAILED DESCRIPTION

Figure 1:
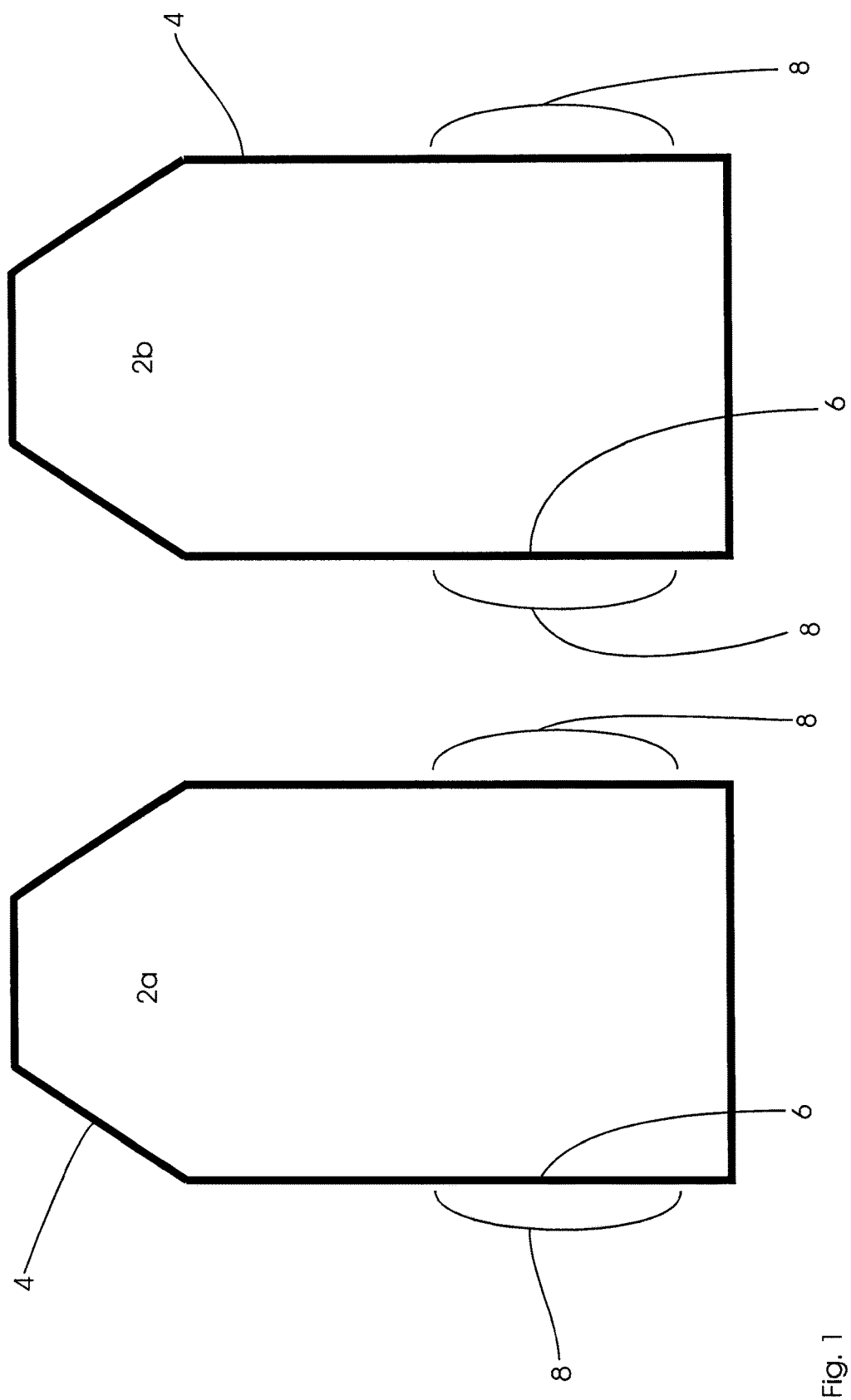
FIG. 1 shows a longitudinal section of a container with a wall reinforcement in the form of a point.

FIG. 1 shows first and second PET (polyethylene tetraphthalate) bottles 2a, 2b. Each bottle 2a, 2b has a wall 4 having a thickened wall section 6. Outside of the thickened wall section 6, the wall thickness is typically about 0.15 millimeters.

The thickened wall section 6 is where a glue point is to be applied in order to form a glued joint. An application of wall reinforcement 8 in the thickened wall section 6 increases the wall thickness. In some embodiments, the thickness increases by about 30%. In other embodiments, the thickness increases by an amount somewhere between 0.15 millimeters and 0.2 millimeters. In either case, the thickened wall section 6 suppresses the risk of damage when attempting to detach a first bottle 2a from a second bottle 2b to which it has been attached via a glue point as part of the formation of a cluster pack. Preferably, the wall reinforcement 8 is applied at a point about halfway up the bottles 2a, 2b.

In the illustrated embodiment, the wall reinforcement 8 is as a circular surface area, the diameter of which is 10% greater than that of the glue point that is to be applied. The surface of the wall reinforcement 8 is more than 3% larger than the surface of the glued joint. In the illustrated embodiment, the wall reinforcement 8 is a circular lens with a flattened edge region. This configuration reduces material usage.

This wall reinforcement 8 avoids tension peaks that normally arise when detaching the first and second bottles 2a, 2b from each other. This reduces the risk of tearing a bottle 2a, 2b.

In order to be able to add further bottles to the first and second bottles 2a, 2b to form a larger cluster pack, it is useful to apply two additional wall reinforcements 8 onto mutually opposed sides of the first and second bottles 2a, 2b. The bottles 2a, 2b are aligned before the application of the glue point in such a way that the glue point is applied onto the wall reinforcement 8.

In some cases, it is useful for the glued joint to make contact at a wall reinforcement on each of the two bottles connected to one another. To achieve this, the bottles 2a, 2b to be connected are aligned before joining them in such a way that wall reinforcements 8 applied in the form of points come into contact.

Figure 2:
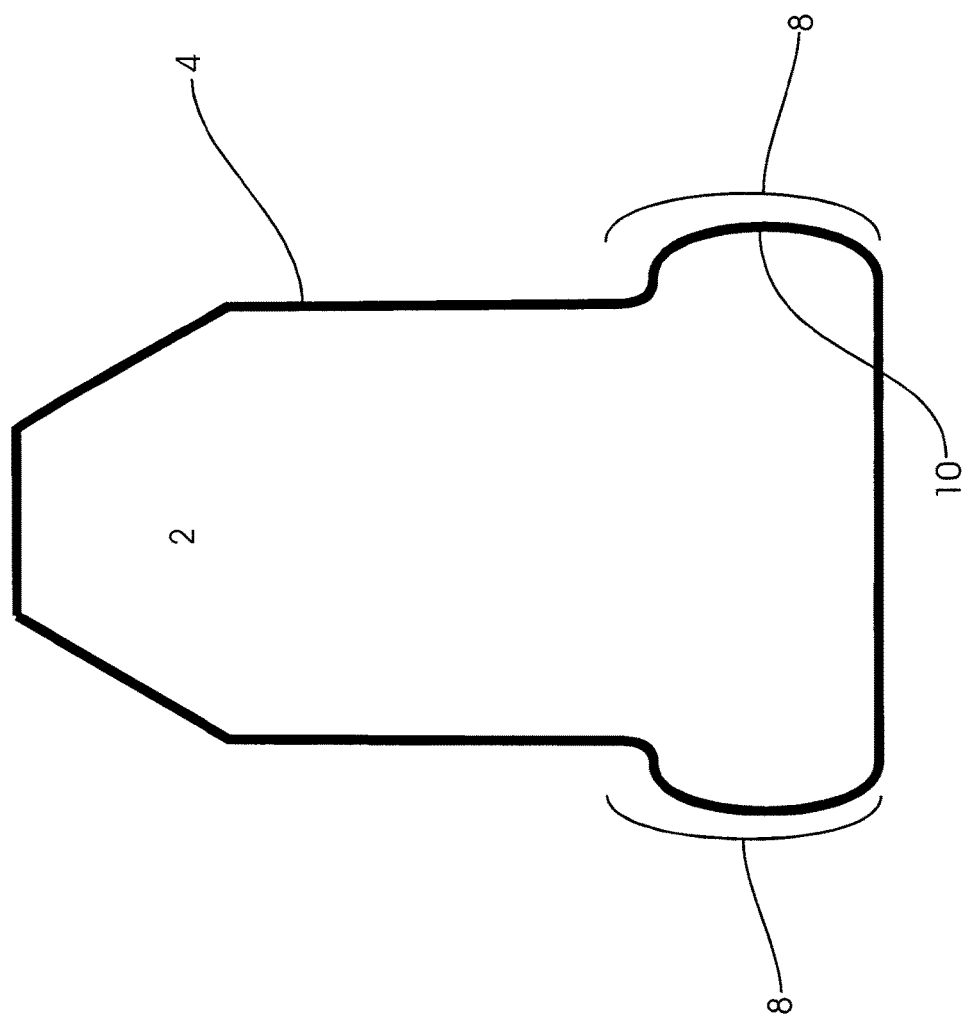
FIG. 2 shows a longitudinal section of a container with a circular wall reinforcement at a roll ring.

FIG. 2 shows another PET bottle 2 having a wall 4 that has a roll ring 10 formed at the lower end thereof. The roll ring 10 extends circumferentially around the cylindrical bottle 2 and thus defines a portion of the wall 4 that has an external diameter that is greater than that of other portions of the wall 4. However, the wall 4 does not have a greater wall thickness in the region of the roll ring 10. Instead, the wall 4 has a constant 0.15 millimeter thickness.

In the embodiment of FIG. 2, the glue point is applied at the roll ring 10 to produce a glued joint. When the bottles are detached, the leverage gives rise to high forces that act on the lower end of the bottle 2. As a result, it is useful to provide the roll ring 10 with a wall reinforcement 8, which is typically also made of PET. This wall reinforcement has a wall thickness that is about 40% greater than that of the wall 4.

In the embodiment shown in FIG. 2, the wall reinforcement 8 extends circumferentially all the way around the bottle. This consumes more material than was the case when the wall reinforcement amounted to a point. However, it also provides the advantage of dispensing with the need for careful alignment. This simplifies bottle manipulation.

A practical method for making a bottle 2 as described above is to start with a preform that is made from whatever plastic the bottle is to be made of. In those cases where the preform is produced by casting, the mold can have cut-outs or indentations that form wall sections having different thicknesses. By suitably shaping the mold, these sections of reinforced wall thickness, or wall reinforcements 8, can be configured as points, flat areas, or rings that extend circumferentially around the bottle.

The dimensions of the wall reinforcement 8 depend on those of the glue points. Typically, the wall reinforcement 8 has diameter that is greater than that of the glue points. Preferably, the diameter is 10% greater.

In some embodiments, the cut-outs are shaped to form a tapering edge region at the wall reinforcement 8. The thickness of the tapering edge region at the wall reinforcement 8 is the same as the maximum thickness of the wall reinforcement 8. As one traverses the tapering edge region away from the wall reinforcement 8, this thickness decreases until it matches that of the surrounding wall 4.

An alternative bottle-manufacturing method includes introducing additional material into the mold's indentations or cut-outs onto which the material of the wall 4 is then applied. The additional material and the material of the wall 4 adhesively bond or fuse with one another. As a result, the wall 4 comprises at least one wall reinforcement 8. Although this alternative method is more elaborate than the other methods described herein, it is useful in certain cases, for example if the material of the wall reinforcement 8 is not identical to that of the wall 4.

In either case, once the preforms have been made, they are then molded to form bottles that comprise one or more wall reinforcements 8 at predetermined points.

Forming a cluster pack from the bottles 2 next includes rotating the bottles into alignment relative to a glue applicator. The glue applicator then applies the glue through a nozzle to form a glue point on the wall reinforcement 8. The bottles are then brought into a position that permits clamping strips press them together in such a way that the walls of the bottles contact each other at the glue point. The glue is then treated to promote hardening or cross-linking, depending on the type of glue being used. Treatments include exposure to radiation, heating, drying, and/or cooling.

Once the glue hardens or undergoes cross-linking, the glued joint forms and the cluster pack is stable. Thanks to the wall reinforcements, it is possible to remove or detach a bottle from the cluster pack without risk of damaging any bottles.

Embodiments include those in which only the first bottle 2a has a wall reinforcement 8 as well as those in which both the first and second bottles 2a, 2b have wall reinforcements 8.

Having described the invention, and a preferred embodiment thereof, what is claimed as new and secured by Letters Patent is:

1. A cluster pack that comprises a glued joint, a wall reinforcement, a first container and a second container, wherein said wall reinforcement is a thickening of a wall of said first container, wherein said glued joint interconnects said first and second containers, and wherein said wall reinforcement is disposed at said glued joint.

2. The cluster pack of claim 1, wherein said wall reinforcement comprises a ring that extends around a circumference of said first container.

3. The cluster pack of claim 1, wherein said wall of said first container comprises a first region having a first wall-thickness and a second region having a second wall-thickness, wherein said second region defines said wall reinforcement, and wherein said second wall-thickness is at least 5% thicker than said first wall-thickness.

4. The cluster pack of claim 1, wherein said wall reinforcement comprises a ring that is part of said wall and that extends around a circumference of said container.

5. The cluster pack of claim 1, wherein said wall of said first container comprises a first region having a first wall-thickness and a second region having a second wall-thickness, wherein said second region defines said wall reinforcement, wherein said second wall-thickness is at least 30% thicker than said first wall-thickness.

6. The cluster pack of claim 1, wherein said wall of said first container comprises a first region having a first wall-thickness and a second region having a second wall-thickness, wherein said second region defines said wall reinforcement, wherein said second wall-thickness is at least 50% thicker than said first wall-thickness.

7. The cluster pack of claim 1, wherein said wall reinforcement has a diameter that is at least 3% greater than a diameter of said glued joint.

8. The cluster pack of claim 1, wherein said wall reinforcement has a diameter that is at least 5% greater than a diameter of said glued joint.

9. The cluster pack of claim 1, wherein said wall reinforcement has a diameter that is at least 10% greater than a diameter of said glued joint.

10. The cluster pack of claim 1, wherein said wall reinforcement has a diameter that is at least 15% greater than a diameter of said glued joint.

11. The cluster pack of claim 1, wherein said wall reinforcement has a surface area that is at least 3% greater than a surface area of said glued joint.

12. The cluster pack of claim 1, wherein said wall reinforcement comprises a base and a plateau that lies opposite said base, wherein said base is located at said wall, and wherein said base is selected from the group consisting of a circular base and an oval base.

13. The cluster pack of claim 1, wherein said wall reinforcement comprises a base at said wall, wherein said base is polygonal.

14. The cluster pack of claim 1, wherein said wall reinforcement comprises a base at said wall, wherein said base is circular.

15. The cluster pack of claim 1, wherein said wall reinforcement comprises a base and a flat surface that lies opposite said base, wherein said base is located at said wall, and wherein said wall reinforcement extends between said base and said flat surface.

16. The cluster pack of claim 1, further comprising a tapering transition region between said wall and said wall reinforcement.

17. The cluster pack of claim 1, wherein said wall reinforcement is defined by a rim that is part of said wall and that extends around said first container.

18. The cluster pack of claim 1, wherein said reinforcement extends radially inward towards a vertical axis of said container.

19. A method comprising producing a cluster pack with at least two containers, at least one of which has a wall having a wall reinforcement that comprises a thickening in said wall, wherein producing said cluster pack comprises delivering said containers to a glue applicator, aligning said containers in relation to said glue applicator, causing said glue applicator to apply glue to a glue point on said wall reinforcement, and joining said containers together at said glue point.

20. The method of claim 19, further comprising, prior to delivering said containers, providing preforms for said containers, wherein each of said preforms comprises a wall having a thickening, producing said containers from said preforms, and transporting said containers to said glue applicator for application of glue thereon.

* * * * *